United States Patent
Chang et al.

(10) Patent No.: US 7,663,395 B2
(45) Date of Patent: Feb. 16, 2010

(54) DISPLAY DEVICE, DISPLAY PANEL THEREFOR, AND INSPECTION METHOD THEREOF

(75) Inventors: Jong-Woong Chang, Suwon-si (KR); Dong-Gyu Kim, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 10/922,564

(22) Filed: Aug. 19, 2004

(65) Prior Publication Data

US 2005/0078057 A1 Apr. 14, 2005

(30) Foreign Application Priority Data

Aug. 19, 2003 (KR) .................. 10-2003-0057296

(51) Int. Cl.
*G01R 31/00* (2006.01)
*G09G 3/36* (2006.01)
*G02F 1/1345* (2006.01)

(52) U.S. Cl. .................. 324/770; 349/149; 345/51; 345/87; 345/100

(58) Field of Classification Search .................. 324/770; 349/149; 345/51, 87, 100
See application file for complete search history.

(56) References Cited

U.S. PATENT DOCUMENTS

| | | | |
|---|---|---|---|
| 2,047,838 A | 7/1936 | Smith et al. | |
| 5,754,158 A * | 5/1998 | Misawa et al. | 345/100 |
| 6,204,836 B1 | 3/2001 | Yamazaki et al. | |
| 6,437,596 B1 * | 8/2002 | Jenkins et al. | 324/770 |
| 6,750,926 B2 * | 6/2004 | Ohgiichi et al. | 349/40 |
| 6,798,232 B2 * | 9/2004 | Lim | 324/770 |
| 6,879,179 B2 * | 4/2005 | Fujita | 324/770 |
| 7,145,357 B2 * | 12/2006 | Lee | 324/770 |
| 2004/0125307 A1 * | 7/2004 | Lee et al. | 349/149 |
| 2005/0012518 A1 * | 1/2005 | Lee | 324/770 |

FOREIGN PATENT DOCUMENTS

| | | |
|---|---|---|
| CN | 1314671 A | 9/2001 |
| JP | 2000-089191 | 3/2000 |
| JP | 2000-292811 | 10/2000 |
| JP | 2001-265248 | 9/2001 |
| JP | 2002-098992 | 4/2002 |
| KR | 0125266 | 10/1997 |
| KR | 2002094636 | 12/2002 |
| KR | 2003-008407 | 1/2003 |
| WO | WO 02/065062 A2 | 8/2002 |

* cited by examiner

*Primary Examiner*—Ha Tran T Nguyen
*Assistant Examiner*—Emily Y Chan
(74) *Attorney, Agent, or Firm*—Innovation Counsel LLP

(57) ABSTRACT

A display panel is provided, which includes: a plurality of gate lines; a plurality of data lines intersecting the gate lines; a plurality of switching elements connected to the gate lines and the data lines; a plurality of pixel electrodes connected to the switching elements; a plurality of driving signal lines transmitting a plurality of driving signals; a plurality of test pads for test signals disposed near an edge of the panel; and a gate driver generating and applying gate signals to the gate lines responsive to the driving signals transmitted from the driving signal lines.

19 Claims, 9 Drawing Sheets

DISPLAY DEVICE, DISPLAY PANEL THEREFOR, AND INSPECTION METHOD THEREOF

BACKGROUND OF THE INVENTION (a) Field of the Invention

The present invention relates to a display device, a display panel therefor, and an inspection method thereof.

(b) Description of the Related Art

An active type display device such as an active matrix (AM) liquid crystal display (LCD) and an active matrix organic light emitting display (OLED) includes a plurality of pixels arranged in a matrix and including switching elements and a plurality of signal lines such as gate lines and data lines for transmitting signals to the switching elements. The switching elements of the pixels selectively transmit data signals from the data lines to the pixels in response to gate signals from the gate lines for displaying images. The pixels of the LCD adjust transmittance of incident light depending on the data signals, while those of the OLED adjust luminance of light emission depending on the data signals.

The display device further includes a gate driver for generating and applying the gate signals to the gate lines, a data driver for applying the data signals to the data lines, and a signal controller for controlling the gate driver and the data driver.

Recently, the gate driver is integrated on one of the panels together with the switching elements for a narrow bezel and cost reduction (which is referred to as GIL (gate ICless) configuration). For this integration, the gate driver is required to have a simple circuital configuration.

Such a gate driver usually includes a shift register including a series of stages and each stage includes a plurality of transistors. Each stage outputs a gate signal based on a scanning start signal or an output signal of a previous stage and at least a clock signal, and the scanning start signal and the clock signals are supplied from the signal controller through a plurality of signal lines formed on the panel.

Meanwhile, a visual inspection (VI) is executed to inspect the status of gate lines and data lines of a display device. In GIL configuration, a test pad for inspecting the disconnection of the gate lines is provided on the panel and connected to the signal lines for transmitting the scanning signals and the clock signals. For visual inspection, a single test signal having a voltage level for turning on the transistors of the stages of the shift register is applied to the test pad such that the stages can generate a high level voltage to turn on the switching elements of the pixel.

However, the stages may still generate the high level voltage although only a few of the transistors in the stages normally operate, while other transistors do not. Accordingly, the defect of the stages cannot be exactly checked.

Furthermore, since all the stages output and apply the high level voltage to the gate lines at the same time, the inspection for the individual gate lines is not allowed and thus defects such as short circuit between adjacent gate lines may not be detected.

SUMMARY OF THE INVENTION

A motivation of the present invention is to solve the problems of the conventional art.

A display panel is provided, which includes: a plurality of gate lines; a plurality of data lines intersecting the gate lines; a plurality of switching elements connected to the gate lines and the data lines; a plurality of pixel electrodes connected to the switching elements; a plurality of driving signal lines transmitting a plurality of driving signals; a plurality of test pads for test signals disposed near an edge of the panel; and a gate driver generating and applying gate signals to the gate lines responsive to the driving signals transmitted from the driving signal lines.

The test pads are electrically connected to the driving signal lines for test and then the test pads are electrically disconnected from the driving signal lines after the test.

The driving signal lines may include a first signal line for transmitting a first voltage, a plurality of second signal lines for transmitting clock signals having different phases, and a third signal line for transmitting a pulse-like signal.

The first voltage may have a magnitude for turning off the switching elements, the second signal lines may transmit clock signals having opposite phases, and the pulse-like signal enables the gate driver to generate a second voltage for turning on the switching elements.

At least two of the driving signal lines may be commonly connected to one of the test pads.

The at least two driving signal lines commonly connected to the one of the test pads may transmit a gate-off voltage having a magnitude for turning off the switching elements and a scanning start signal enabling the gate driver to generate a gate-on voltage for turning on the switching elements.

The gate driver may include a shift register including a plurality of stages and each stage generates one of the gate signals to be applied to one of the gate lines in response to at least one of the driving signals.

A display device is provided, which includes: a panel unit including a plurality of gate lines, a plurality of data lines intersecting the gate lines, a plurality of pixels including switching elements connected to the gate lines and the data lines, a plurality of driving signal lines transmitting driving signals, and a plurality of test pads for test signals disposed near an edge of the panel; a signal controller outputting image data and applying the driving signals to the driving signal lines; a gate driver generating and applying gate signals to the gate lines responsive to at least one of the driving signals from the driving signal lines; and a data driver applying data signals corresponding to the image data to the data lines.

The driving signal lines may transmit a gate-off voltage for turning off the switching elements, first and second clock signals having opposite phases, and a scanning start signal for enabling the gate driver to generate a gate-on voltage for turning on the switching elements.

Two of the driving signal lines may be commonly connected to one of the test pads.

The two of the driving signal lines may transmit the gate-off voltage and the scanning start signal.

The one of the test pads connected to the two driving signal lines may be supplied with a signal having a waveform made by synthesizing waveforms of the gate-off voltage and the scanning start signal.

The gate driver may include a shift register including a plurality of stages and each stage generates one of the gate signals to be applied to one of the gate lines in response to at least one of the driving signals.

The panel unit may further include a plurality of data transmission lines transmitting the image data from the signal generator to the data driver.

The data driver may include a plurality of driving circuits and the panel unit may further include a plurality of interconnections connected between the driving circuits and transmitting the image data between the driving circuits.

A method of inspecting a display panel including a plurality of pixels having switching elements, a shift register electrically connected to the switching elements, first to fourth test pads electrically connected to the shift register is provided, which includes: applying a gate-off voltage for turning off the switching elements to the first test pad; applying first and second clock signals having opposite phases to the second and the third test pads; applying a scanning start signal to the fourth test pad for enabling the gate driver to generate a gate-on voltage for turning on the switching elements; and supplying inspection data to the pixels through the switching elements.

A method of inspecting a display panel including a plurality of pixels having switching elements, a shift register electrically connected to the switching elements, first to third test pads electrically connected to the shift register is provided, which includes: applying first and second clock signals having opposite phases to the first and the second test pads; applying a gate-off voltage for turning off the switching elements to the third test pad; applying a scanning start signal to the third test pad for enabling the gate driver to generate a gate-on voltage for turning on the switching elements; and supplying inspection data to the pixels through the switching elements.

The method may further include: separating the first to the third test pads from the shift register.

BRIEF DESCRIPTION OF THE DRAWINGS

The present invention will become more apparent by describing embodiments thereof in detail with reference to the accompanying drawings in which.

DETAILED DESCRIPTION OF EMBODIMENTS

Figure 1:
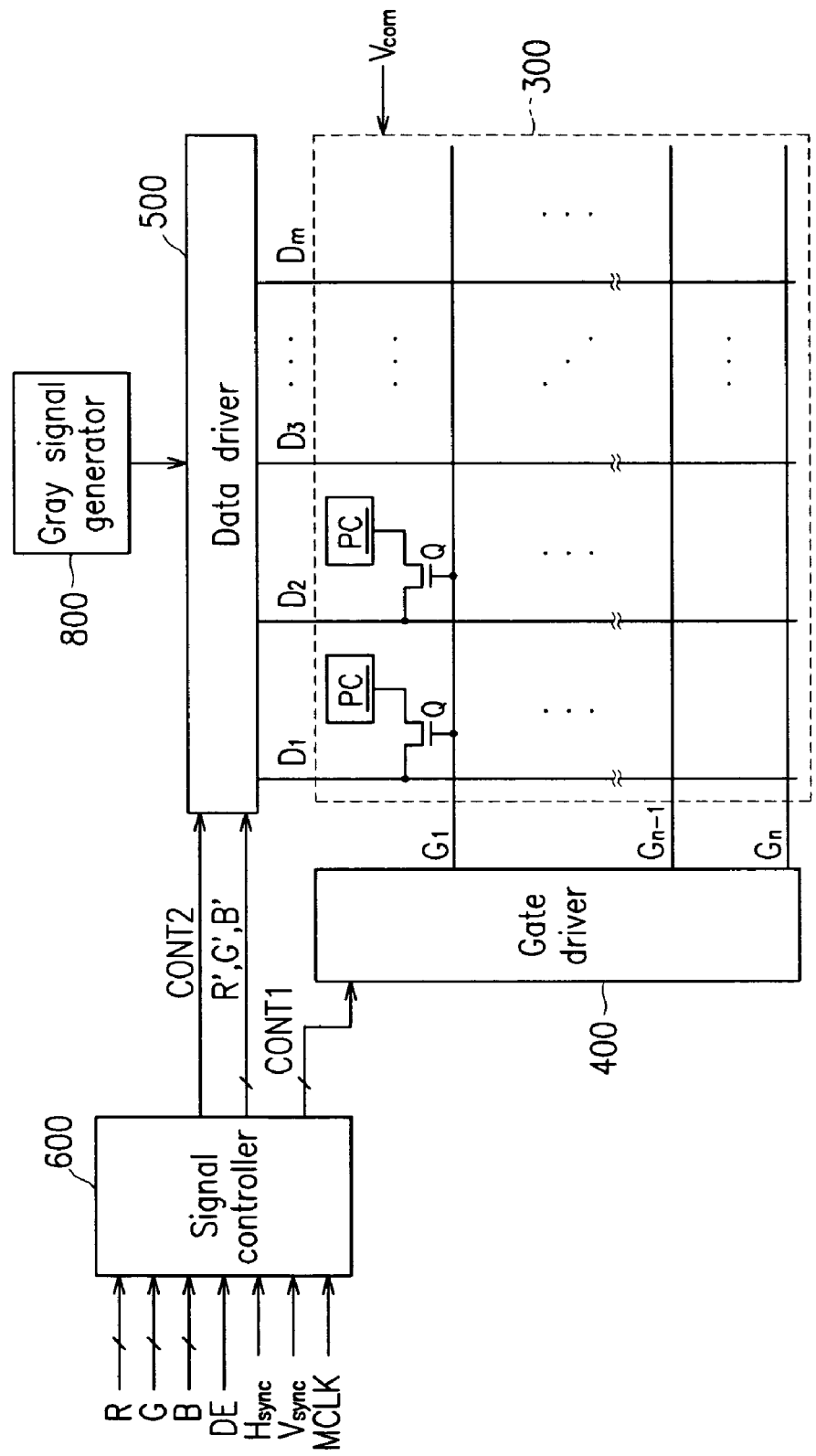
FIG. 1 is a block diagram of a display device according to an embodiment of the present invention.

The present invention now will be described more fully hereinafter with reference to the accompanying drawings, in which preferred embodiments of the invention are shown. The present invention may, however, be embodied in many different forms and should not be construed as limited to the embodiments set forth herein.

In the drawings, the thickness of layers, films and regions are exaggerated for clarity. Like numerals refer to like elements throughout. It will be understood that when an element such as a layer, film, region or substrate is referred to as being "on" another element, it can be directly on the other element or intervening elements may also be present. In contrast, when an element is referred to as being "directly on" another element, there are no intervening elements present.

Then, display devices and display panels therefor according to embodiments of the present invention will be described with reference to the accompanying drawings.

Figure 2:
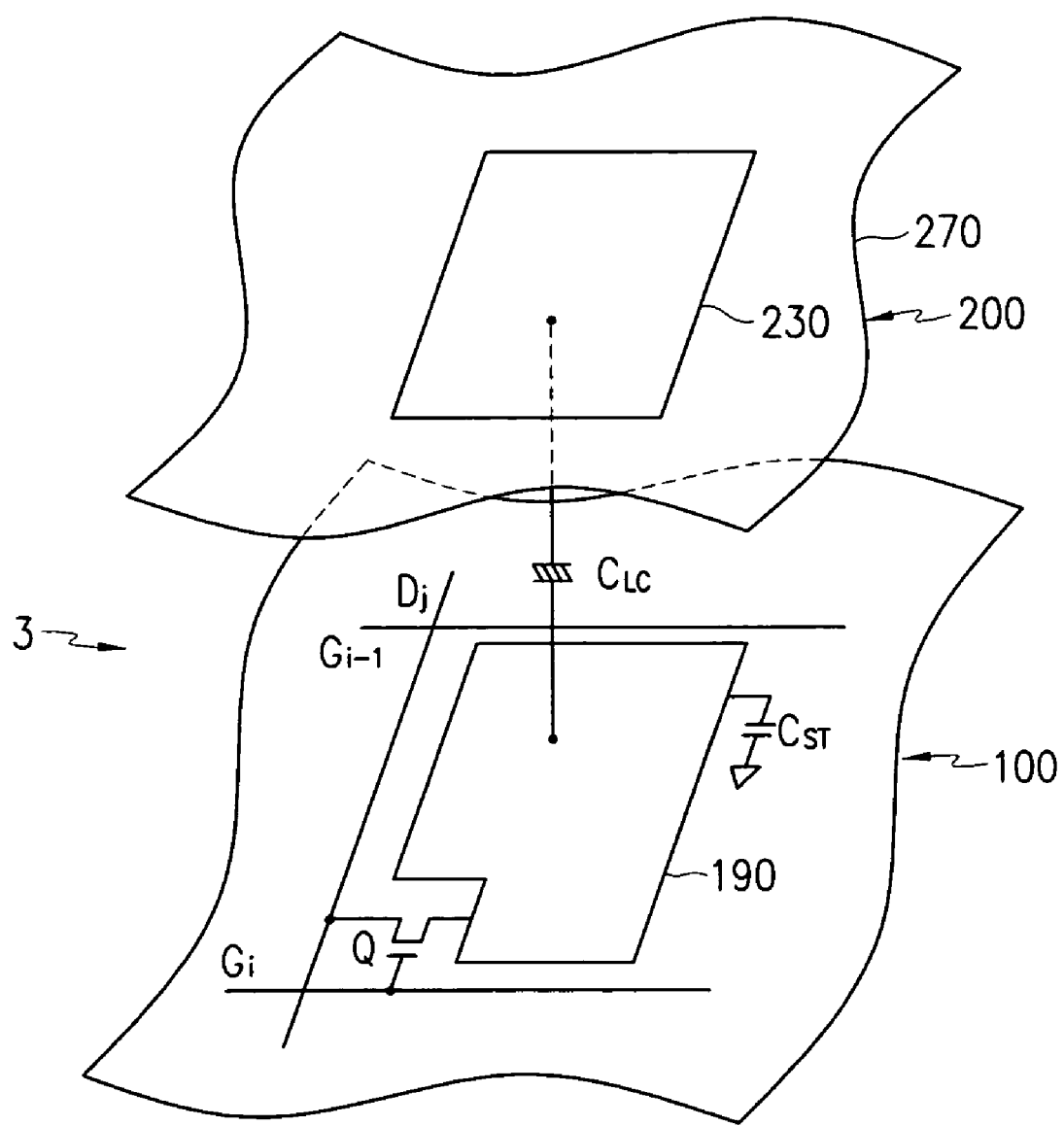
FIG. 2 is an equivalent circuit diagram of a pixel of an LCD according to an embodiment of the present invention.

Referring to FIGS. 1 and 2, a display device according to an embodiment of the present invention is described in detail.

FIG. 1 is a block diagram of a display device according to an embodiment of the present invention, and FIG. 2 is an equivalent circuit diagram of a pixel of an LCD according to an embodiment of the present invention.

Referring to FIG. 1, a display device according to an embodiment of the present invention includes a panel unit 300, a gate driver 400 and a data driver 500 that are connected to the panel unit 300, a gray signal generator 800 connected to the data driver 500, and a signal controller 600 controlling the above elements.

The panel unit 300 includes a plurality of display signal lines G1-Gn and D1-Dm and a plurality of pixels connected thereto and arranged substantially in a matrix.

The display signal lines G1-Gn and D1-Dm include a plurality of gate lines G1-Gn transmitting gate signals (called scanning signals) and a plurality of data lines D1-Dm transmitting data signals. The gate lines G1-Gn extend substantially in a row direction and they are substantially parallel to each other, while the data lines D1-Dm extend substantially in a column direction and they are substantially parallel to each other.

Each pixel includes a switching element Q connected to the display signal lines G1-Gn and D1-Dm, and a pixel circuit PC connected to the switching element Q. The switching element Q such as a TFT includes a control terminal connected to one of the gate lines G1-Gn, an input terminal connected to one of the data lines D1-Dm, and an output terminal connected to the pixel circuit PC.

Referring to FIG. 2, a pixel of an LCD as a representative of the display device, which includes lower and upper panels 100 and 200 facing each other and a liquid crystal layer 3 interposed between the lower panel 100 and the upper panel 200, includes an LC capacitor $C_{LC}$ and a storage capacitor $C_{ST}$ that are connected to the switching element Q.

The LC capacitor $C_{LC}$ includes a pixel electrode 190 disposed on the lower panel 100, a common electrode 270 disposed on the upper panel 200, and the LC layer 3 as a dielectric between the electrodes 190 and 270. The pixel electrode 190 is connected to the switching element Q, and the common electrode 270 covers the entire surface of the upper panel 100 and is supplied with a common voltage $V_{com}$. Alternatively, both the pixel electrode 190 and the common electrode 270, which may have shapes of bars or stripes, are provided on the lower panel 100.

The storage capacitor $C_{ST}$ is an auxiliary capacitor for the LC capacitor $C_{LC}$ and it may be omitted if unnecessary. The storage capacitor $C_{ST}$ includes the pixel electrode 190 and a separate signal line (not shown), which is provided on the lower panel 100, overlaps the pixel electrode 190 via an insulator, and is supplied with a predetermined voltage such as the common voltage Vcom. Alternatively, the storage capacitor $C_{ST}$ includes the pixel electrode 190 and an adjacent gate line called a previous gate line, which overlaps the pixel electrode 190 via an insulator.

For color display, each pixel uniquely represents one of three primary colors (i.e., spatial division) or each pixel represents three primary colors in turn (i.e., time division) such that spatial or temporal sum of the three primary colors are recognized as a desired color. FIG. 2 shows an example of the spatial division that each pixel is provided with a color filter 230, one of red, green and blue color filters, in an area of the upper panel 200 facing the pixel electrode 190. Alternatively, the color filter 230 is provided on or under the pixel electrode 190 on the lower panel 100.

A pair of polarizers (not shown) polarizing the light are attached on the outer surfaces of the panels 100 and 200.

Referring back to FIG. 1, the gray signal generator 800 generates a plurality of gray signals related to the luminance of the pixels. For the LCD shown in FIG. 2, two sets of a plurality of gray signals having different polarities with respect to the common voltage Vcom may be prepared by the gray signal generator 800.

The gate driver 400 is connected to the gate lines G1-Gn and synthesizes the gate-on voltage Von and the gate-off voltage Voff to generate gate signals for application to the gate lines G1-Gn. The gate driver 400 may be integrated in the panel unit 300 or mounted on the panel unit 300.

The data driver 500 is connected to the data lines D1-Dm of the panel unit 300 and applies data signals, which are selected from the gray signals supplied from the gray signal generator 800, to the data lines D1-Dm.

The signal controller 600 controls the drivers 400 and 500, etc.

A detailed example of the display device shown in FIG. 1 according to an embodiment of the present invention is now described with reference to FIGS. 3 and 4.

Figure 3:
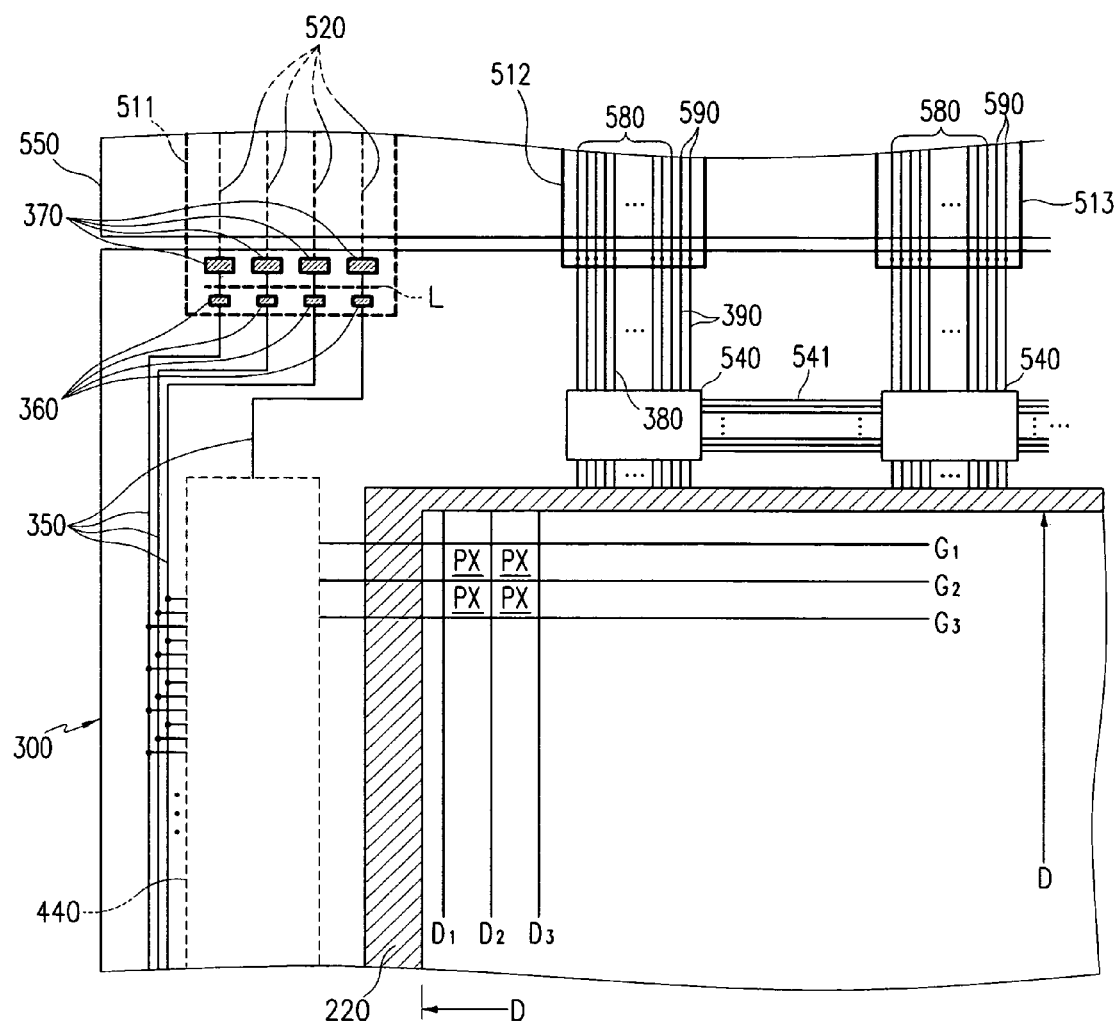
FIG. 3 is a schematic layout view of a display device according to an embodiment of the present invention.
Figure 4:
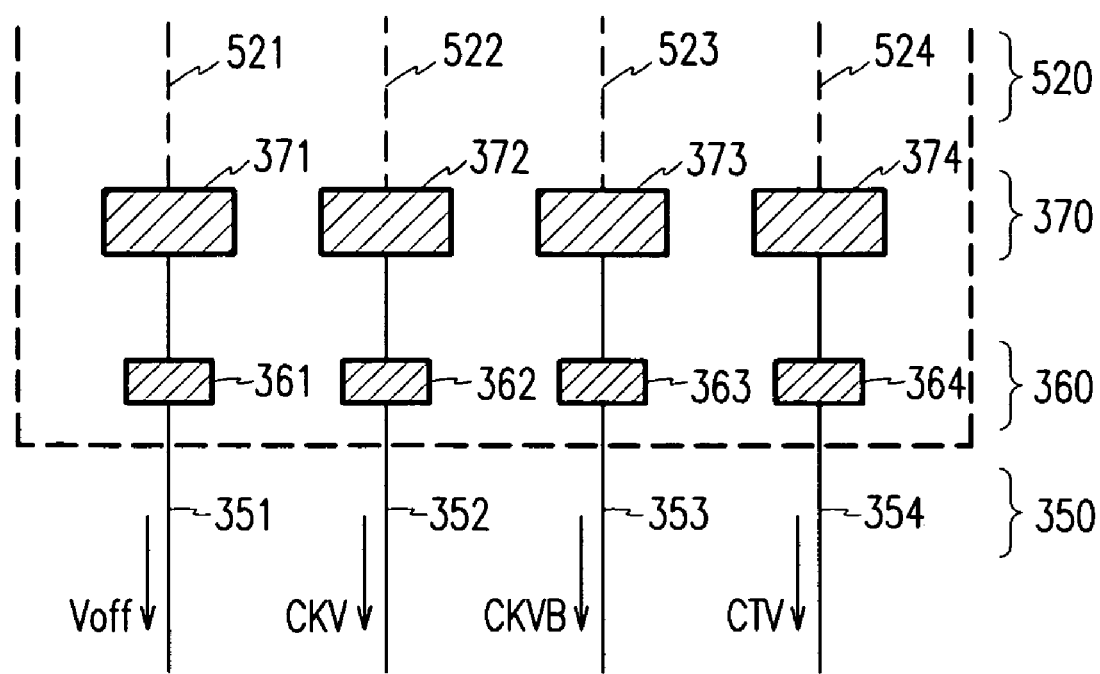
FIG. 4 is an expanded view of a connection portion of the display device shown in FIG. 3.

FIG. 3 is a schematic layout view of a display device according to an embodiment of the present invention, and FIG. 4 is an expanded view of a connection portion of the display device shown in FIG. 3.

As shown in FIG. 3, a panel unit 300 includes a plurality of gate lines G1-Gn, a plurality of data lines D1-Dm, and a gate driver as a shift register 440 disposed near a left edge of the panel unit 300. A plurality of data driving IC chips 540 are mounted on the panel unit 300 and they are disposed near a top edge of the panel unit 300. A PCB 550 is disposed near a top edge of the panel unit 300 and circuit elements such as a signal controller 600 and a gray signal generator 800 are provided on the PCB 550. The panel unit 300 and the PCB 550 are electrically and physically interconnected by a plurality of FPC films 511-513.

The leftmost FPC film 511 includes a plurality of driving signal lines 520 transmitting driving signals for activating the shift register 440. The driving signals from the driving signal lines 520 is supplied to the shift register 440 through driving signal lines 350 disposed left to the shift register 440 on the panel unit 300.

The next FPC film 512 includes a plurality of data transmission lines 580 and a plurality of driving signal lines 590. The data transmission lines 580 for transmitting image data are connected to input terminals of the data driving ICs 540 through lead lines 380 disposed on the panel unit 300. The driving signal lines 590 transmit electrical voltages and control signals for activating the data driving ICs 540 via driving signal lines 390 disposed on the panel unit 300.

The remaining FPC films 513 include a plurality of driving signal lines 590 transmitting electrical voltages and control signals to the data driving ICs 540 electrically connected thereto.

The signal lines 520, 580 and 590 are connected to the circuit elements on the PCB 550 and receive signals therefrom.

As shown in FIG. 3, a plurality of pixel areas PX defined by the intersections of the gate lines G1-Gn extending in the transverse direction and the data lines D1-Dm extending in the longitudinal direction form a display area D on the panel unit 300. A black matrix 220 (indicated by hatched area) for blocking light leakage exterior to the display area D is disposed around the display area D. The gate lines G1-Gn as well as the data lines D1-Dm extend substantially parallel to each other in the display area D.

The data driving ICs 540 are disposed outside of the display area D and sequentially arranged in the transverse direction. Adjacent data driving ICs 540 are connected by a plurality of interconnections 541 and the image data transmitted from the FPC film 512 to the leftmost data driving IC 540 are then transmitted to the next data driving IC 540 via the interconnections 541, and so on.

Referring to FIG. 4, the driving signal lines 350 include a gate voltage line 351 for transmitting a gate-off voltage Voff, a pair of clock signal lines 352 and 353 for transmitting clock signals CKV and CKVB having opposite phases, respectively, and a scanning start signal line 354 for transmitting a scanning start signal STV. The driving signal lines 351-354 include input pads 361-364 at their upper ends, respectively.

Furthermore, a plurality of test pads 371-374 that are electrically connected to the input pads 361-364, respectively, are provided above the input pads 361-364, respectively.

The arrangement of the driving signal lines 351-354 and the test pads 371-374 may be changed.

Dummy pads (not shown) which are disposed on the panel unit 300 may be substituted for the test pads 371-374.

Figure 5:
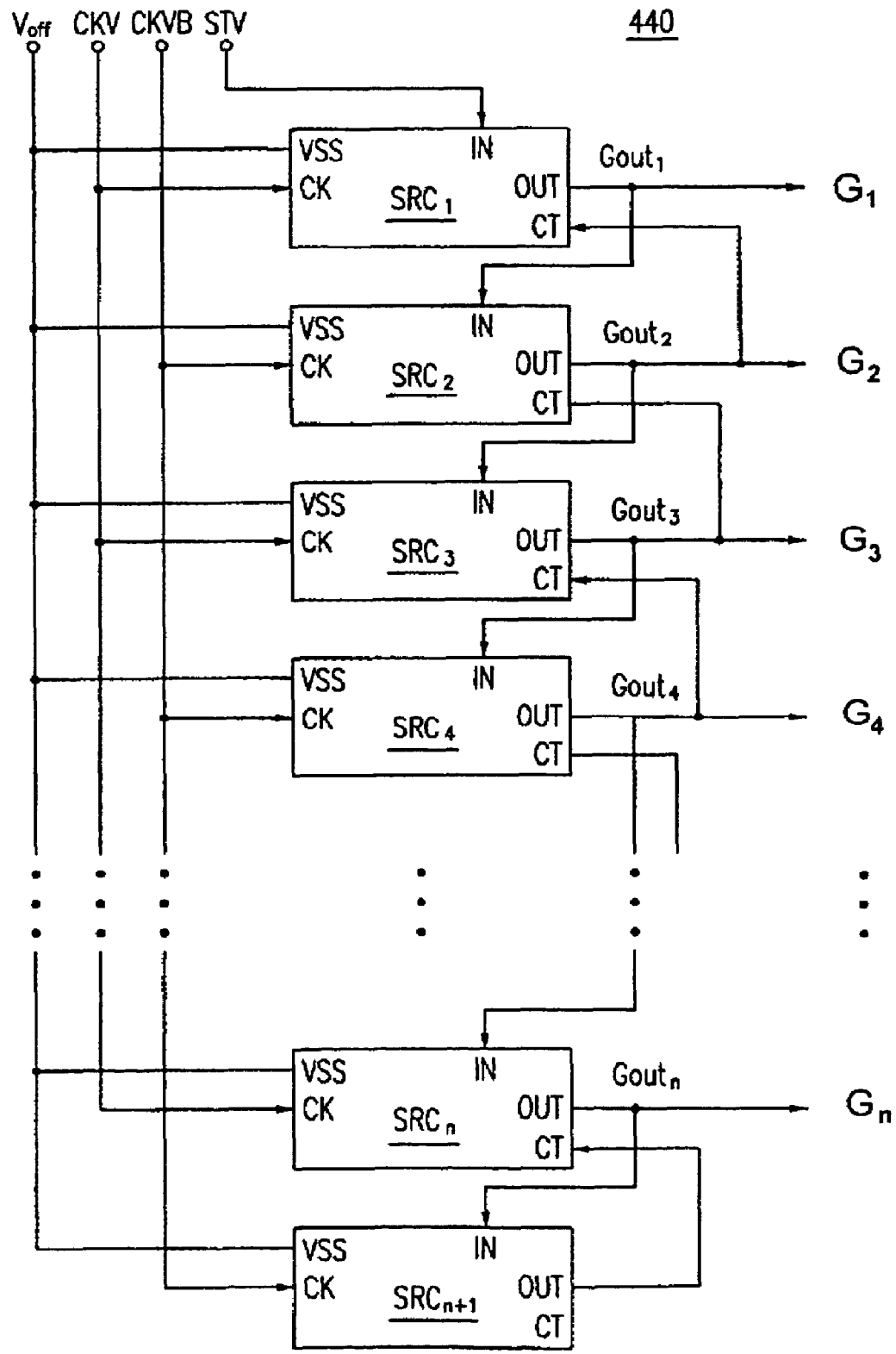
FIG. 5 is a block diagram of a shift register for a gate driver according to an embodiment of the present invention.
Figure 6:
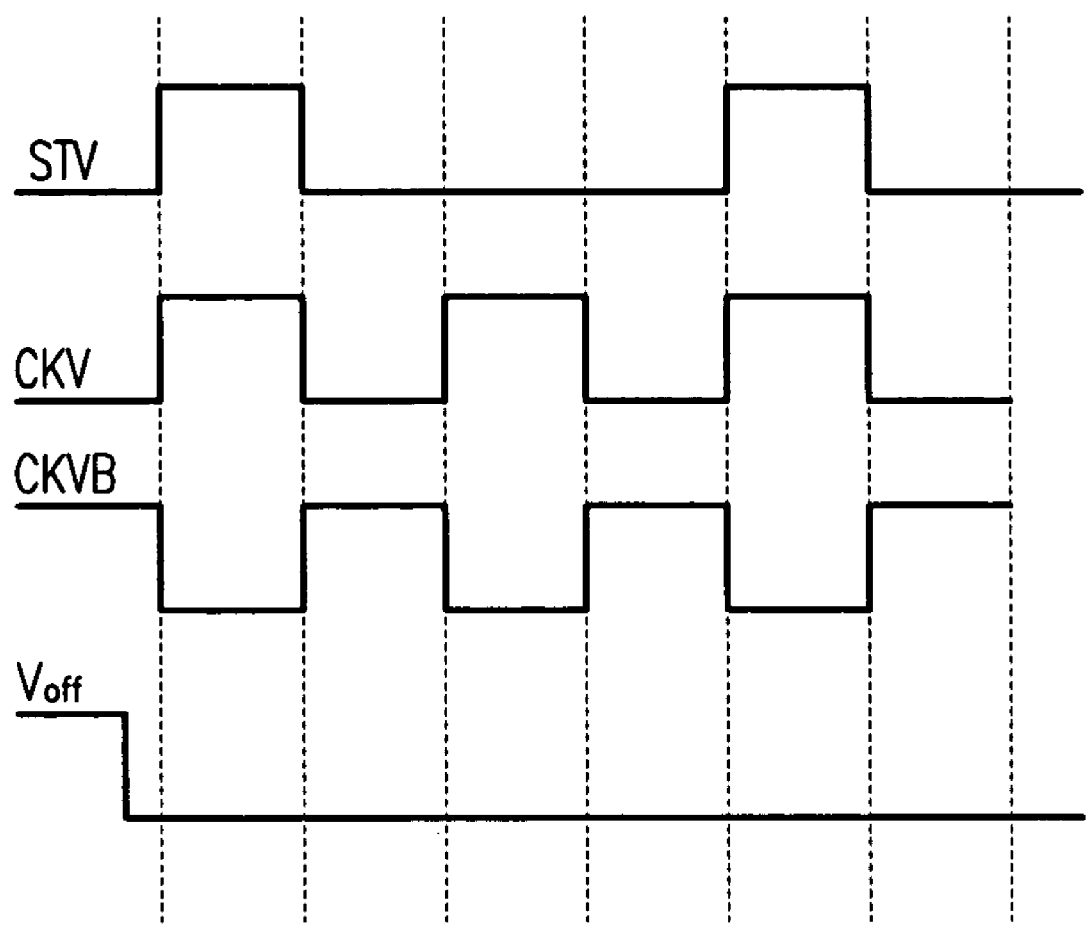
FIG. 6 illustrates exemplary waveforms of driving signals and test signals applied to the shift register shown in FIG. 5.

Referring to FIGS. 5 and 6, an example of the shift register shown in FIG. 3 is described in detail.

FIG. 5 is a block diagram of a shift register according to an embodiment of the present invention, and FIG. 6 illustrates wave forms of driving signals for the shift register shown in FIG. 5.

As shown in FIG. 5, a shift register 440 according to an embodiment of the present invention includes a plurality of stages $SRC_1$-$SR_{n+1}$ connected in sequence. The stages include a plurality of regular stages $SRC_1$-$SRC_n$ connected to gate lines and one dummy stage $SRC_{n+1}$. Each stage $SRC_1$-$SRC_{n+1}$ has an input terminal IN, an output terminal OUT, a control terminal CT, a clock terminal CK, and a voltage terminal VSS.

The input terminal IN of the first stage $SRC_1$ is supplied with a scanning start signal STV, and the input terminal IN of each stage $SRC_2$-$SRC_{n+1}$ except for the first stage $SRC_1$ is connected to the output terminal OUT of a previous stage $SRC_1$-$SRC_n$.

The clock terminal CK of each stage $SRC_1$-$SRC_{n+1}$ receives one of two clock signals CKV and CKVB having opposite phases. The odd stages SRC1, SRC3, ... are supplied with the clock signal CKV, while the even stages SRC2, SRC4, ... are supplied with the clock CKVB.

The control terminal CT of each stage $SRC_1$-$SRC_n$ except for the dummy stage $SRC_{n+1}$ is connected to the output terminal OUT of the next stage $SRC2$-$SRC_{n+1}$.

The voltage terminal VSS receives the gate-off voltage Voff for turning off the switching elements Q.

Now, the operation of the display device shown in FIGS. 1-6 will be described in detail.

The signal controller 600 receives, from an external graphics controller (not shown), input image data R, G, and B and input control signals for controlling the display thereof. The input control signals include a vertical synchronization signal Vsync, a horizontal synchronization signal Hsync, a main clock CLK, and a data enable signal DE. The signal controller 600 generates gate control signals CONT1 and data control signals CONT2 and processes the input image data R, G, and B to be suitable for the operation of the panel unit 300 based on the input image data R, G and B and the input control signals. Subsequently, the signal controller 600 sends the gate control signals CONT1 to the gate driver 400, and sends the data control signals CONT2 and the processed image data R', G', and B' to the data driver 500.

The gate control signals CONT1 include the scanning start signal STV instructing to start scanning, the clock signals CKV and CKVB, and the gate-off voltage $V_{off}$. The gate-off voltage Voff may be supplied from another device.

The data control signals CONT2 include a horizontal synchronization start signal STH for informing of start of a horizontal period, a load signal LOAD for instructing to apply the data signals to the data lines D1-Dm, and a data clock signal HCLK. For the LCD shown in FIG. 2, the data control signals CONT2 may further include an inversion control signal RVS for reversing the polarity of the data voltages (with respect to the common voltage $V_{com}$).

The gate control signals CONT1 are transmitted to the stages $SCR_1$-$SCR_{n+1}$ of the gate driver 400, i.e., the shift register 440 via the driving signal lines 520 and 350, and the data control signals CONT2 and the processed image data R', G' and B' are transmitted via the driving signal lines 580 and 590 and the lead lines 380 and 390.

Referring to FIGS. 1 and 3, the gray signal generator 800 generates and transmits the gray signals to the data driver 500 via the lead lines 390.

The data driver 500 receives a packet of the image data R', G' and B' for a pixel row from the signal controller 600 in response to the data control signals CONT2 from the signal controller 600. In detail, the leftmost data driving IC 540 receives the packet of the image data R', G' and B' in a sequential manner through the lead lines 380, stores the image data for itself, and transmits the image data for other data driving ICs 540 to a next data driving IC 540. Likewise, each of remaining data driving ICs 540 receives the image data from a previous data driving IC 540, stores the image data for itself, and transmits the image data for other data driving ICs 540 to a next driving IC 540.

The data driving ICs 540 convert the image data R', G' and B' into analog data signals selected from the gray signals supplied from the gray signal generator 800 and apply the data signals to the data lines D1-Dm in response to the data control signals CONT2 from the signal controller 600.

Responsive to the gate control signals CONT1 from the signal controller 600, the gate driver 400 applies the gate-on voltage Von to the gate line G1-Gn, thereby turning on the switching elements Q connected thereto. The data signals applied to the data lines D1-Dm are supplied to the pixels PX through the activated switching elements Q.

In the LCD shown in FIG. 2, the difference between the voltage of the data signal (i.e., the data voltage) and the common voltage Vcom applied to a pixel PX is expressed as a charged voltage of the LC capacitor $C_{LC}$, i.e., a pixel voltage. The liquid crystal molecules have orientations depending on the magnitude of the pixel voltage, which determine the polarization of light passing through the LC capacitor $C_{LC}$. The polarizers convert the light polarization into the light transmittance.

By repeating this procedure by a unit of a horizontal period (which is indicated by 1H and equal to one period of the horizontal synchronization signal Hsync and the data enable signal DE), all gate lines G1-Gn are sequentially supplied with the gate-on voltage Von during a frame, thereby applying the data signals to all pixels PX. In the LCD shown in FIG. 2, when the next frame starts after finishing one frame, the inversion control signal RVS applied to the data driver 500 is controlled such that the polarity of the data voltages is reversed (which is called "frame inversion"). The inversion control signal RVS may be also controlled such that the polarity of the data voltages flowing in a data line in one frame are reversed (for example, line inversion and dot inversion), or the polarity of the data voltages in one packet are reversed (for example, column inversion and dot inversion).

Referring to FIGS. 5 and 6, the operation of the gate driver, that is, the shift register 440 will be described more in detail.

The signal controller 600 generates the scanning start signal STV based on the vertical synchronization signal Vsync and applies it to the first stage $SRC_1$ of the shift register 440.

Each stage $SRC_1$-$SRC_{n+1}$, for example, the i-th (i=1, 2, ..., n) stage $SRC_i$ generates an output signal $Gout_i$ (referred to as a gate signal before) based on either the scanning start signal STV (for i=1) or the output signal $Gout_{i-1}$ of a previous stage $SRC_{i-1}$, the output signal $Gout_{i+1}$ of a following stage $SRC_{i+1}$, and one of the clock signals CKV and CKVB. The adjacent stages $SRC_1$-$SRC_{n+1}$ receive different clock signals CKV and CKVB, which have opposite phases and a period of 2H.

The high level voltage of each clock signal CKV or CKVB functions as the gate-on voltage Von to turn on the switching elements Q of the pixels PX.

The previous output signal $Gout_{i-1}$ enables the stage $SRC_i$ to make the output signal $Gout_i$ in a high state, while the output signal $Gout_{i-1}$ of the following stage $SRC_{i+1}$ controls the operation of the stage $SRC_i$ such that the stage $SRC_i$ makes the output signal $Gout_i$ in a low state.

In this way, the stages $SRC_1$-$SRC_n$ sequentially apply the gate-on voltage Von to the gate lines G1-Gn. The dummy stage $SRC_{n+1}$ generates the output signal $Gout_{n+1}$ for controlling the output signal $Gout_n$ of the previous stage $SRC_n$.

Now, a VI test for inspecting the operation of each stage of the shift register 440 as well as the gate lines G1-Gn and the pixels PX in the display device is described with reference to the figures.

After the panel unit 300 is manufactured, test signals having the waveforms as shown in FIG. 6 are applied to the respective test pads 371-374 disposed on the panel unit 300 preferably using a probe (not shown) of an inspecting apparatus (not shown), and then the test signals are transmitted to the terminals of the stages $SRC_1$-$SRC_{n+1}$ of the shift register 440. In addition, test image data are supplied to the data driving ICs 540 and converted into analog voltages to be applied to the data lines D1-Dm.

The stages $SCR_1$-$SRC_{n+1}$ generate output signals such that the high level voltages are sequentially outputted from the first stage $SRC_1$ to the last stage $SRC_{n+1}$.

When the stages $SRC_1$-$SRC_{n+1}$ are in normal operation and output the gate-on voltage Von in a sequential manner, the pixels PX safely receive their voltages from the data lines D1-Dm and the display device displays normal images.

However, when a stage $SRC_j$ is defected not to generate the gate-on voltage Von, all the next stages $SRC_{j+1}$-$SRC_{n+1}$ and a previous stage $SRC_{j-1}$ may not also normally operate. Therefore, the display device shows abnormal image from a line connected to the stage $SRC_j$ and to the last line and this can be distinguished from the defect of the gate lines G1-Gn, the data lines D1-D2, and the pixels PX, which occupy a very small area such as a few points or a few lines. Accordingly, the inspector can determine the defect of the shift register 440 using his eyes.

After the visual inspection, the test pads 371-374 may be separated from the driving signal lines 351-354 by laser trimming along a line L shown in FIG. 3.

Another embodiment of the present invention is described in detail with reference to FIGS. 7-9.

Figure 7:
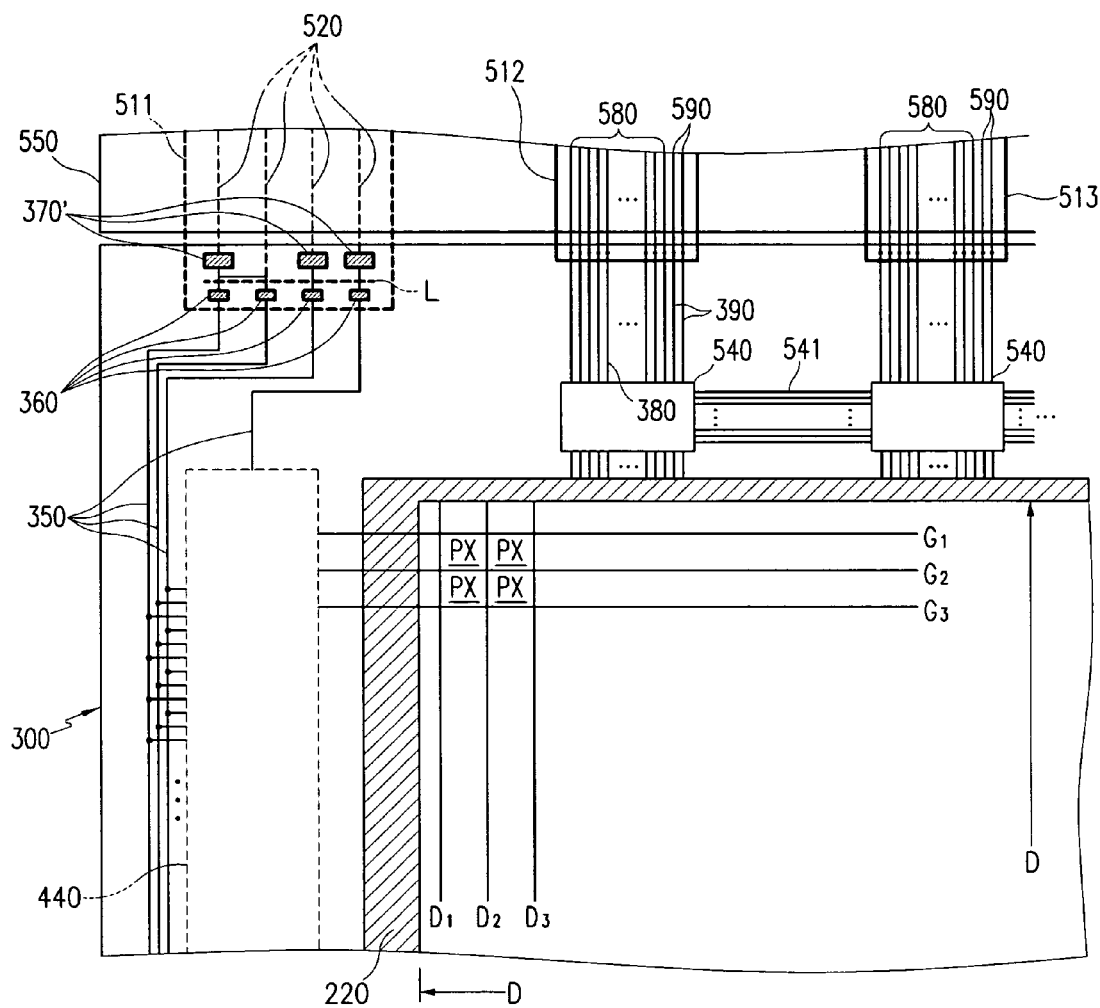
FIG. 7 is a schematic layout view of a display device according to another embodiment of the present invention.
Figure 8:
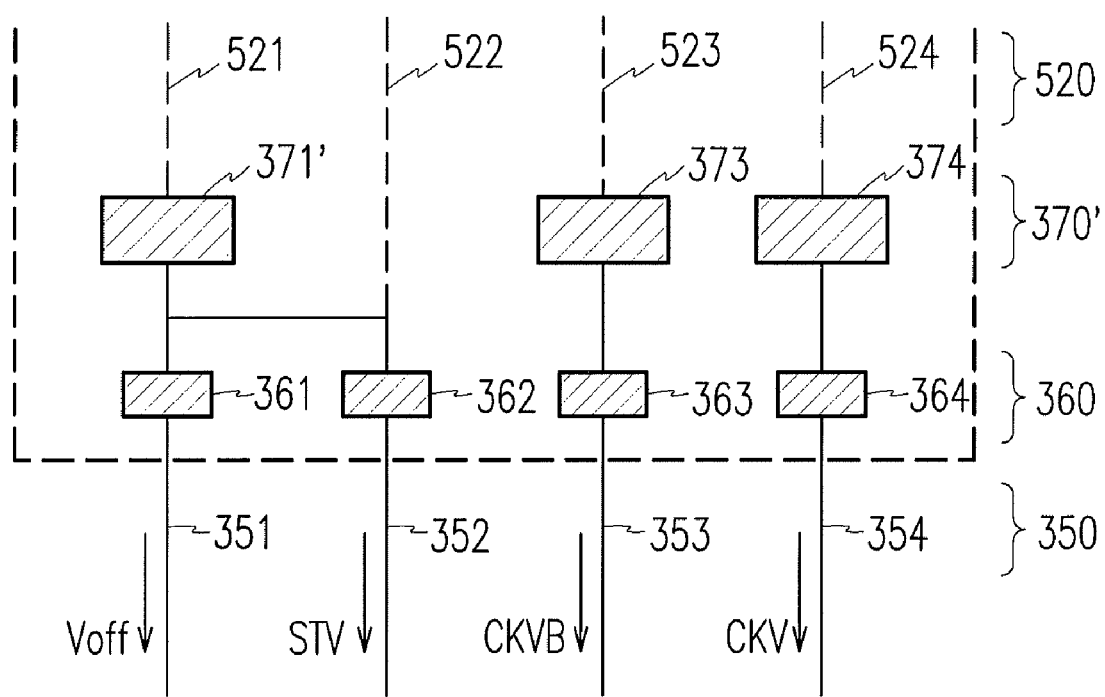
FIG. 8 is an expanded view of a connection portion of the display device shown in FIG. 7.
Figure 9:
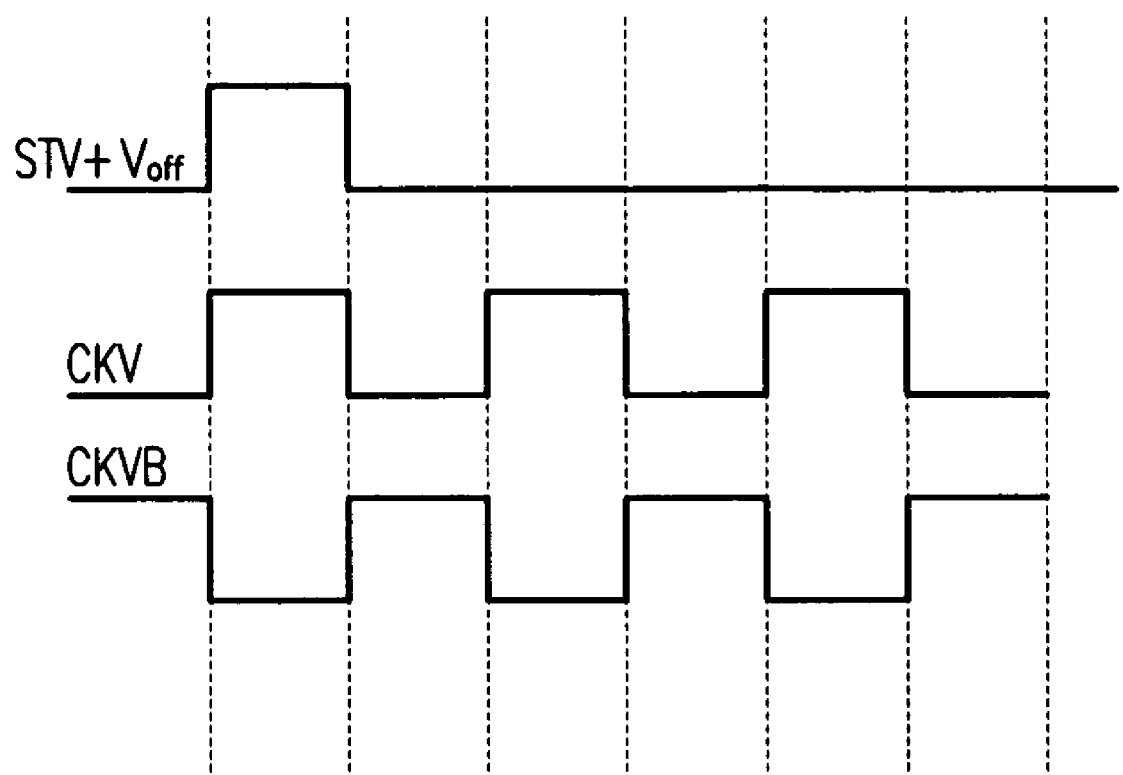
FIG. 9 illustrates exemplary waveforms of test signals for the display device shown in FIGS. 7 and 8.

FIG. 7 is a schematic layout view of a display device according to another embodiment of the present invention, FIG. 8 is an expanded view of a connection portion of the display device shown in FIG. 7, and FIG. 9 illustrates waveforms of test signals for the display device shown in FIGS. 7 and 8.

Referring to FIGS. 7 and 8, one test pad 371 is disposed on the panel unit 300 for applying a combination of the gate-off voltage Voff and the scanning start signal STV. In this case, the driving signal lines 351 and 352 for respectively applying the signals Voff and STV may be disposed adjacent and electrically connected to each other, as illustrated in FIG. 8.

The combined test signal STV+Voff applied to the test pad 371 is shown in FIG. 9. Since the scanning start signal STV has a high level for a time as an enable signal for the first stage SRC1, while the gate-off voltage Voff is constant over a frame, the shift register 440 can normally operate under the application of the test signals shown in FIG. 9.

As a result, the number of the test pads is reduced.

In the above-described embodiments of the present invention, the gate driver 400 is described to be integrated in or mounted on the panel unit 300, but it may be mounted on other device(s) such as flexible printed circuit film(s) that is attached to the panel unit 300.

As described above, various test signals for activating the gate driver are supplied to the gate driver instead of applying a single test signal to the gate driver. Accordingly, the display device operates as it is in a normal operation and thus an inspector can exactly inspect the defect of the stages as well as the gate lines, respectively. For example, since the states of the signals applied to adjacent gate lines differ from each other, the short circuit between the adjacent gate lines can be detected.

In addition, the dummy pads may be used for test pads instead of providing additional test pads, thereby reducing manufacturing cost.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A display panel, comprising:
   a plurality of gate lines;
   a plurality of data lines intersecting the gate lines;
   a plurality of switching elements connected to the gate lines and the data lines;
   a plurality of pixel electrodes connected to the switching elements;
   a plurality of driving signal lines transmitting a plurality of driving signals;
   a plurality of input pads, each connected to a respective one of the driving signal lines;
   a plurality of test pads for test signals disposed near an edge of the panel, each electrically connected to a respective one or more of the driving signal lines; and,
   a gate driver generating and applying gate signals to the gate lines responsive to the driving signals transmitted from the driving signal lines,
   wherein the gate driver is integrated in the display panel, and
   the driving signal lines comprise a first signal line for transmitting a first voltage, a plurality of second signal lines for transmitting clock signals having different phases, and a third signal line for transmitting a pulse-like signal.

2. The display panel of claim 1, wherein the number of the test pads is equal to the number of the driving signal lines.

3. The display panel of claim 1, wherein the number of the test pads is less than the number of the driving signal lines.

4. The display panel of claim 3, wherein at least two of the driving signal lines are commonly connected to one of the test pads.

5. The display panel of claim 4, wherein the at least two driving signal lines commonly connected to the one of the test pads transmit a gate-off voltage having a magnitude for turning off the switching elements and a scanning start signal enabling the gate driver to generate a gate-on voltage for naming on the switching elements.

6. The display panel of claim 1, wherein the first voltage has a magnitude for turning off the switching elements.

7. The display panel of claim 1, wherein the second signal lines transmit clock signals having opposite phases.

8. The display panel of claim 1, wherein the pulse-like signal enables the gate driver to generate a second voltage for turning on the switching elements.

9. The display panel of claim 1, wherein the gate driver comprises a shift register including a plurality of stages, and each stage generates one of the gate signals to be applied to one of the gate lines in response to at least one of the driving signals.

10. A display device, comprising:
    a panel unit, including a plurality of gate lines, a plurality of data lines intersecting the gate lines, a plurality of pixels including switching elements connected to the gate lines and the data lines, a plurality of driving signal lines transmitting driving signals, a plurality of input pads, each connected to a respective one of the driving signal lines, and a plurality of test pads for test signals disposed near an edge of the panel, each electrically connected to a respective one or more of the driving signal lines;
    a signal controller outputting image data and applying the driving signals to the driving signal lines;
    a gate driver generating and applying gate signals to the gate lines responsive to at least one of the driving signals from the driving signal lines; and,
    a data driver applying data signals corresponding to the image data to the data lines,
    wherein the gate driver is integrated iii the panel unit and connected to the test pads via the input pads, and
    the driving signal lines transmit a gate-off voltage for turning off the switching elements, first and second clock signals having opposite phases, and a scanning start signal for enabling the gate driver to generate a gate-on voltage for turning on the switching elements.

11. The display of claim 10, wherein two of the driving signal lines are commonly connected to one of the test pads.

12. The display of claim 11, wherein the two of the driving signal lines transmit the gate-off voltage and the scanning start signal.

13. The display of claim 12, wherein the one of the test pads connected to the two driving signal lines are supplied with a signal having a waveform made by synthesizing waveforms of the gate-off voltage and the scanning start signal.

14. The display of claim 10, wherein the gate driver comprises a shift register including a plurality of stages and each stage generates one of the gate signals to be applied to one of the gate lines in response to at least one of the driving signals.

15. The display, of claim 10, wherein the panel unit further comprises a plurality of data transmission lines transmitting the image data from the signal generator to the data driver.

16. The display of claim 15, wherein the data driver comprises a plurality of driving circuits and the panel unit further comprises a plurality of interconnections connected between the driving circuits and transmitting the image data between the driving circuits.

17. A method of inspecting a display panel including a plurality of pixels having switching elements, a gate driver, including a shift register electrically connected to the switching elements via a plurality of gate lines and operative to turn rows of the switching elements on and off sequentially in response to control signals applied thereto, and first to fourth rest pads electrically connected to the shift register via a plurality of driving signal lines, the method comprising:
    applying a gate-off voltage for turning off the switching elements to the first test pad;
    applying first and second clock signals having opposite phases to the second and the third test pads;
    applying a scanning start signal to the fourth test pad for enabling the gate driver to generate a gate-on voltage for turning on the switching elements; and,
    supplying inspection data to the pixels through the switching elements.

18. A method of inspecting a display panel including a plurality of pixels having switching elements, a gate driver including a shift register electrically connected to the switching elements via a plurality of gate lines and operative to turn rows of the switching elements on and off sequentially in response to control signals applied thereto, and first to third test parts electrically connected to the shift register via a plurality of driving signal lines, the method comprising:

applying first and second clock signals having opposite phases to the first and the second test pads;

applying a gate-off voltage for turning off the switching elements to the third test pad;

applying a scanning start signal to the third test pad for enabling the gate driver to generate a gate-on voltage for turning on the switching elements; and, supplying inspection data to the pixels through the switching elements.

19. The method of claim 18, further comprising:

electrically disconnecting the first to the third test pads from the driving signal lines connecting them to the shift register.

* * * * *